(12) United States Patent
Lin

(10) Patent No.: US 9,071,161 B2
(45) Date of Patent: Jun. 30, 2015

(54) SINGLE STAGE PFC POWER SUPPLY

(71) Applicant: Fuxiang Lin, Lidcombe (AU)

(72) Inventor: Fuxiang Lin, Lidcombe (AU)

( * ) Notice: Subject to any disclaimer, the term of this patent is extended or adjusted under 35 U.S.C. 154(b) by 37 days.

(21) Appl. No.: 13/773,358

(22) Filed: Feb. 21, 2013

(65) Prior Publication Data

US 2014/0233264 A1 Aug. 21, 2014

(51) Int. Cl.
*H02M 5/42* (2006.01)
*H02M 7/04* (2006.01)
*H02M 7/68* (2006.01)
*H02M 1/42* (2007.01)

(52) U.S. Cl.
CPC ............ *H02M 1/4258* (2013.01); *Y02B 70/126* (2013.01)

(58) Field of Classification Search
CPC .......................... H02M 1/4258; Y02B 70/126
USPC ............... 363/17, 21.02, 21.03, 21.18, 21.12, 363/56.02, 89, 132
See application file for complete search history.

(56) References Cited

U.S. PATENT DOCUMENTS

| | | | | |
|---|---|---|---|---|
| 5,712,780 | A * | 1/1998 | Youn et al. | 363/131 |
| 6,118,673 | A * | 9/2000 | Hua | 363/56.11 |
| 6,636,430 | B1 * | 10/2003 | Batarseh et al. | 363/21.01 |
| 6,987,676 | B2 * | 1/2006 | Cheng et al. | 363/21.12 |
| 7,532,489 | B2 * | 5/2009 | Lin et al. | 363/21.08 |
| 2009/0185398 | A1 * | 7/2009 | Cuk | 363/21.1 |
| 2012/0120697 | A1 * | 5/2012 | Cuk | 363/126 |

* cited by examiner

*Primary Examiner* — Jue Zhang

(57) ABSTRACT

A single stage power factor correction power supply has two transformers: a main transformer and an auxiliary transformer (forward transformer). The main transformer transfers energy form the primary circuit to the secondary circuit. The auxiliary transformer is used to correct input current waveform. The advantage of this design over the two stage power supply is that the voltage across the storage capacitor can be designed to be only slightly higher than the peak value of the rectified input voltage. Therefore, it uses less energy to correct input current waveform and results in less of an Electromagnetic Compatibility problem because it has lower input current amplitude through the inductor than that of the two stage PFC power supply.

18 Claims, 5 Drawing Sheets

SINGLE STAGE PFC POWER SUPPLY

The present invention relates to a power converter, and more particularly, to a power factor correction (PFC) power converter in a single stage.

DESCRIPTION OF THE RELATED ART

Power converters have widely served to convert an unregulated power source to a regulated voltage or current. A PFC (Power Factor Correction) technique is applied to make an input current follow the waveform of an input voltage. Adding a PFC stage to the front end of a power converter substantially avoids unnecessary power loss and heat dissipation in a power contribution system.

Referring to FIG. 1, a power converter having two stages, according to prior art is illustrated. A first stage is PFC stage, which includes an inductor L1, a rectifier D1 and a transistor Q1 which is driven by a PFC control signal from the PFC stage. A second stage includes a transistor Q2 controlled by a control signal PWM, a transformer T1 and secondary circuitry, thus output voltage is regulated and output ripple noise is reduced. However, the PFC stage configuration increases the cost and the device counts of the converter, and hence the efficiency of power converter is reduced. Therefore, the development trend of a power converter is to build a single stage power converter with a PFC function. The present invention provides a single stage PFC converter that reduces the cost and the size, i.e. device counts, and improves the converter efficiency. The present invention can further provide a power converter operating in lower stress to obtain higher reliability.

SUMMERY OF THE INVENTION

The first objective of the present invention is to provide a switching power supply that operates from AC line voltage and has power factor correction and output isolation.

The second objective of this invention is to provide for a one stage power factor correction in an AC to DC converter.

The third objective of the present invention is to provide a simple circuit of PFC power supply to reduce the manufacture cost.

The fourth objective of the present invention is to provide a more efficient PFC power supply circuit.

Further objects and advantages of this invention will be apparent from the following detailed description of a presently preferred embodiment, which is illustrated, schematically, in the accompanying drawings.

DESCRIPTION OF THE PREFERRED EMBODIMENT

Before explaining the disclosed embodiment of the present invention in detail, it is to be understood that the invention is not limited in its application to the details of the particular arrangement shown since the invention is capable of other embodiments. The topology of the present invention is that a (PFC) forward transformer primary winding is connected in series with the main transformer primary winding. The main transformer transfers power from the primary circuit to the secondary circuit, the forward transformer transfers power to its second winding of the forward transformer to correct the input current waveform.

Figure 1:
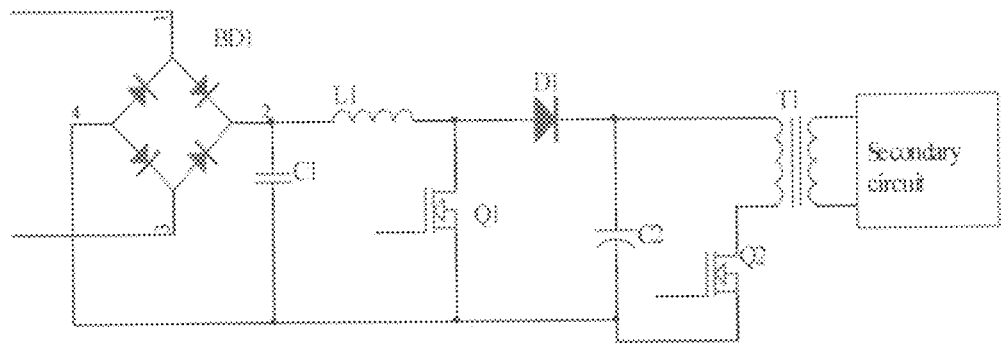
FIG. 1 is a schematic of the prior art, the two stage AC to DC converter.
Figure 2:
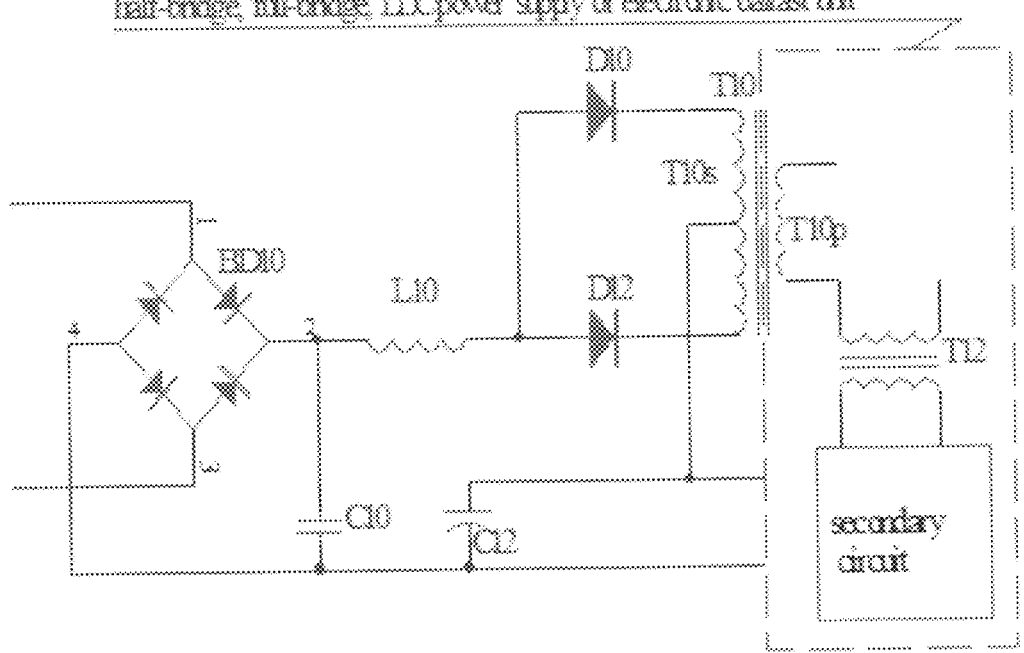
FIG. 2 is a schematic of the present invention of a half-bridge, or a full-bridge, or a LLC power supply or an electronic ballast.
Figure 2A:
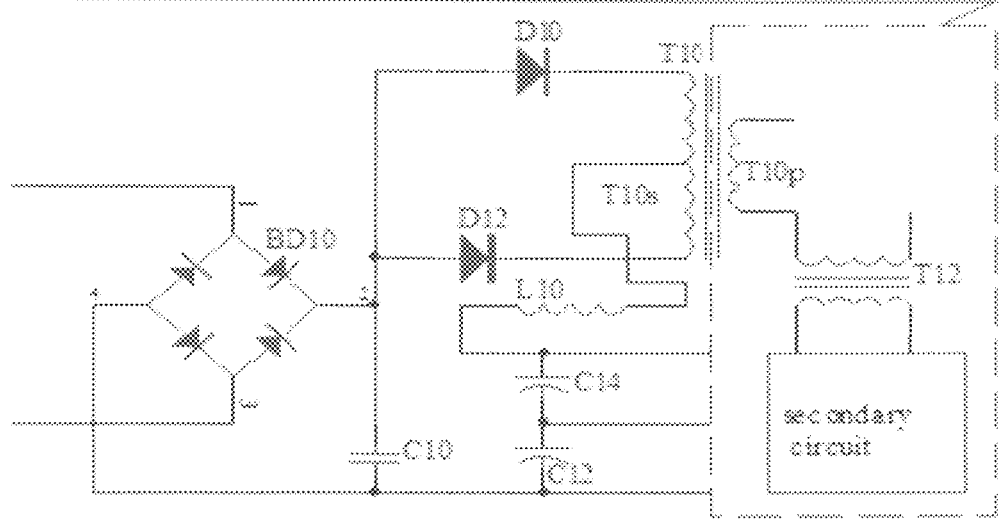
FIG. 2a is an arrangement of a half-bridge or a full-bridge or a LLC power supply or an electronic ballast in accordance with the present invention.

Refer to FIG. 2

The converter includes a bridge rectifiers BD10, two capacitors (C10, C12), two diodes (D10, D12), a forward transformer including two windings (T10p, T10s with center-tap) and a main transformer T12 including a primary winding and a secondary winding. The bridge rectifier BD10 has input terminals, which are coupled to the input power lines, and two output terminals: a positive output terminal and a negative output terminal.

A first capacitor C10 is coupled to output terminals of the full bridge rectifier BD10.

An inductor L10 has a first terminal which is coupled to the positive output of the full-bridge rectifier and its a second terminal.

The first diode D10 has a cathode and an anode which is coupled to the second terminal of the inductor L10.

A second diode D12 has a cathode and an anode which is coupled to the second terminal of the inductor L10.

A forward transformer T10 has a primary winding T10p, a second winding T10s with a center tap. The second winding T10s has a first terminal which is coupled to the cathode of the first diode D10 and a second terminal which is coupled to the cathode of the first diode D12. The primary winding T10p is connected in series with the primary winding of the main transformer in the circuit of a half bridge or a full bridge or a LLC power supply or connected in series with the inductor of an electronic ballast.

The second capacitor C12 has a negative terminal which is coupled to the negative output terminal of the bridge rectifier BD10 terminal and a positive terminal which is coupled to the center tap of the second winding of the forward transformer T10.

Figure 2B:
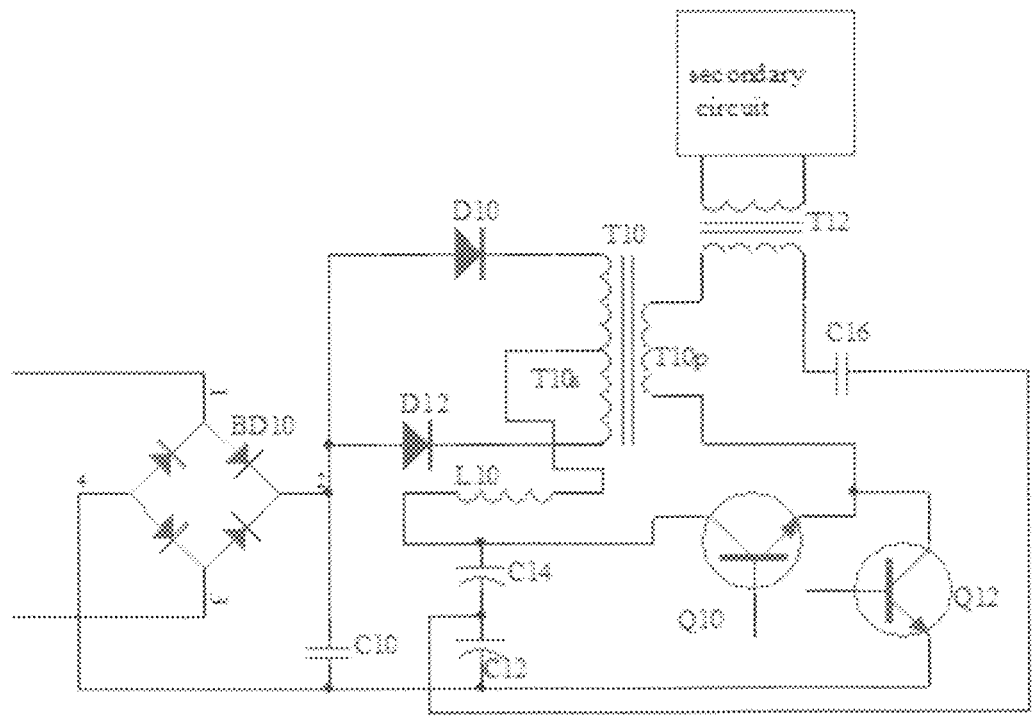
FIG. 2b is an embodiment of the present invention of the primary circuit of a half bridge power supply.

The Operation of the FIG. 2 (Half-Bridge Power Supply FIG. 2b as Example):

When the first switch Q10 is turned on, a current discharging from the second capacitor C12 conducts through the first switch Q10, the primary winding T10p of the forward transformer T10, the primary winding T12p of the main transformer T12 and the fourth capacitor C16 and at the same time, the current from the output of the full bridge rectifier BD10 conducts through the inductor L10, the first diode D10 and the second winding T10s of the forward transformer to charge the second capacitor C12 and the third capacitor C14 because there is an induced voltage in the second winding of the forward transformer. When the first switch Q10 is turned off, the induced voltage in the inductor L10 and the input voltage force a current which conducts through the second diode D12 to charge the second and the third capacitor capacitors.

When the second switch is turned on, a current discharging from the third capacitor C14 conducts through the fourth capacitor C16, the primary winding T12p of the main transformer T12, the primary winding T10p of the forward transformer T10 and the second switch Q12 and at the same time, the current from the output of the bridge rectifier BD10 conducts through the inductor L10 the second diode D12 and the second winding T10s of the forward transformer to charge the second capacitor C12 and the third capacitor C14. When the second switch Q12 is turned off, the induced voltage in the inductor L10 and the input voltage force the current which conducts through the first diode D10 to charge the second and the third capacitors.

The number of the windings of the second winding T10s of the forward transformer T10 is more than four times of that of the primary winding T10p of the forward transformer T10.

The number of the windings of the primary winding of the forward transformer T10 and the value of the inductor L10 are adjusted to a certain value to correct the input current waveform in the best shape.

Figure 4:
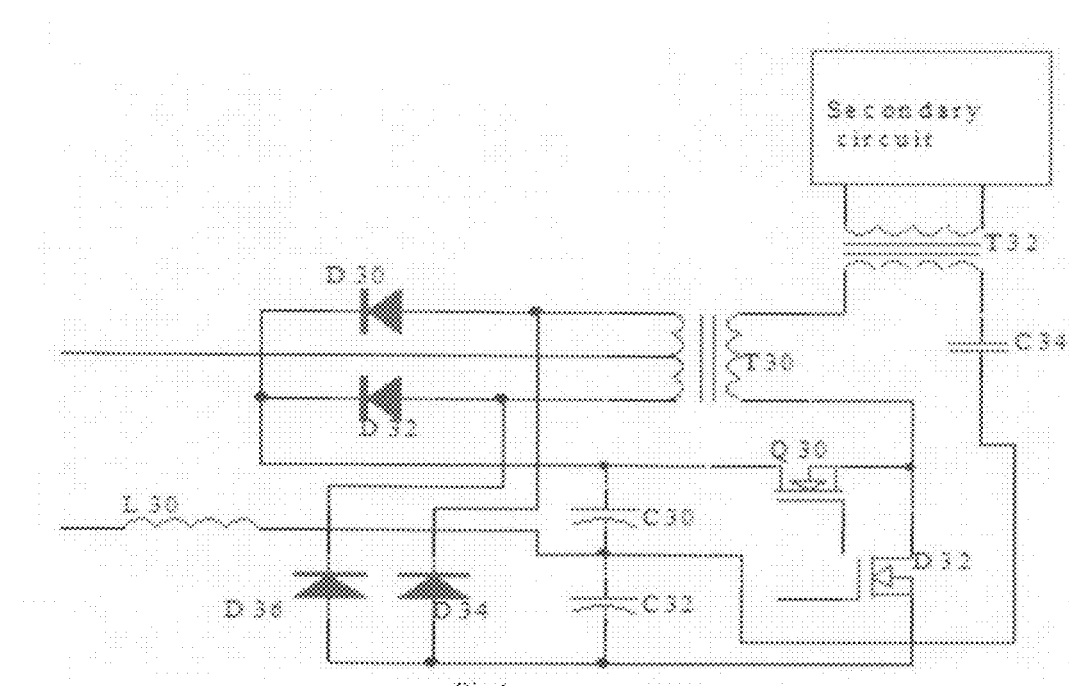
FIG. 4 is a schematic of the present invention of a half-bridge or a LLC power supply of the 120 v AC input.

For 120V AC power source, the circuit can be arranged as FIG. 4. The number of the windings of the second winding of the forward transformer T30 is more than two times of that of the primary winding of the forward transformer. The number of the windings of the primary winding is designed to provide enough energy to correct the input current waveform.

Figure 6:
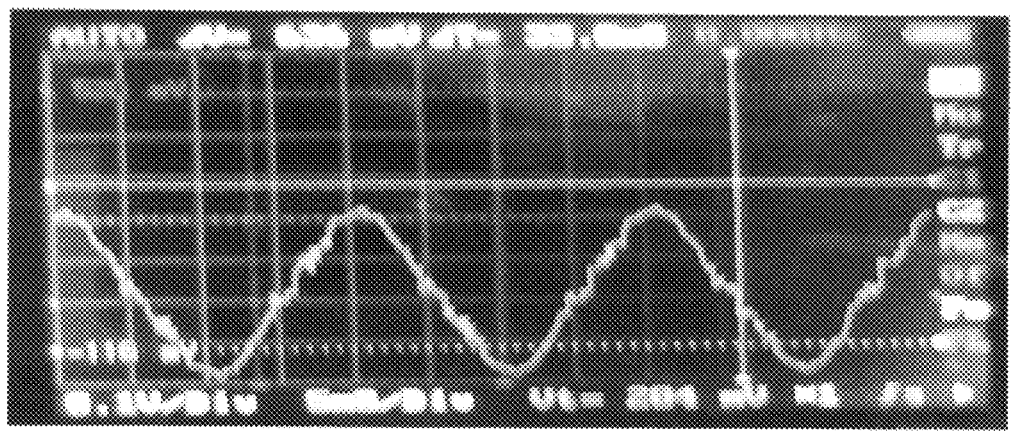
FIG. 6 is an input current waveform of 250 w computer power supply.

FIG. 6 is one waveform of the half-bridge computer power supply prototype.

The circuit, comprising of the second winding T10s of the forward transformer T10, the inductor L10, the first diode D10, the second diode D12, the second capacitor C12 and the third capacitor C14, can have numerous different arrangements. These arrangements have the same working principle. For example, an arrangement of these components is: The inductor L10 is coupled between the positive output terminal of the full bridge rectifier BD10 and the positive terminal of the second capacitor C12; The first diode D10 has a cathode coupled to the negative output terminal of the full bridge rectifier BD10; The second winding T10s of the forward transformer T10 has its center tap coupled to the negative terminal of the third capacitor C14 and its first terminal coupled to the anode of the first diode D10; The second diode D12 has the cathode coupled to the negative output terminal of the full bridge rectifier BD10 and the anode coupled to the second terminal of the second winding T10s of the forward transformer T10.

Figure 3:
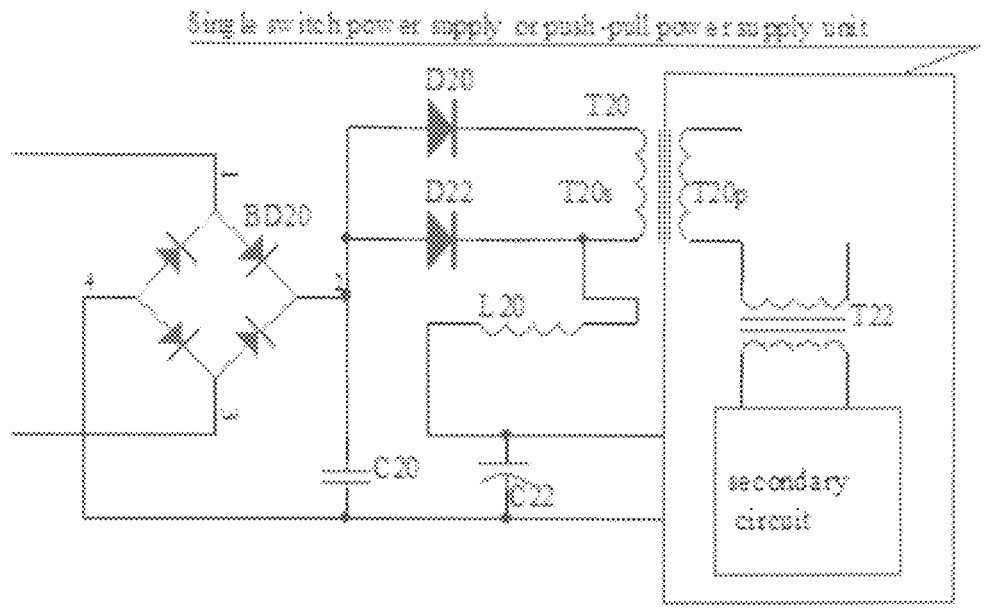
FIG. 3 is a schematic of the present invention of a single switch or a pull-push power supply.

Refer to FIG. 3:

The circuit diagram is a power factor correction for a single switch power supply unit or a push-pull power supply unit according the present invention.

A full bridge rectifier BD20 has output terminals La positive terminal and a negative terminal) and input terminals which are coupled to AC power lines.

A first capacitor C20 is coupled to the output terminals of the full bridge rectifier BD20.

An inductor L20 has two terminals, the second terminal and the first terminal which is coupled to the positive output terminal of the full bridge rectifier BD20.

A first diode D20 has a cathode and an anode which is coupled to the second terminal of the inductor L20.

A second diode D22 has a cathode and an anode which is coupled to the second terminal of the inductor L20.

A forward transformer T20 has two windings. The second winding T20s has a first terminal which is coupled to the cathode of the first diode D20 and a second terminal which is coupled to the cathode of the second diode D22. The primary winding T20p of the forward transformer T20 is connected to the primary winding of the main transformer T22 in series.

A second capacitor has a positive terminal and a negative terminal. The positive terminal is coupled to the second terminal of the second winding T20s of the forward transformer T20 and the negative terminal is coupled to the negative output of the full bridge rectifier BD20.

A primary winding of the main transformer T22 can be the primary winding of a fly-back transformer of a fly-back power supply unit, a forward transformer of a power supply unit or a push-pull power supply unit.

Figure 3A:
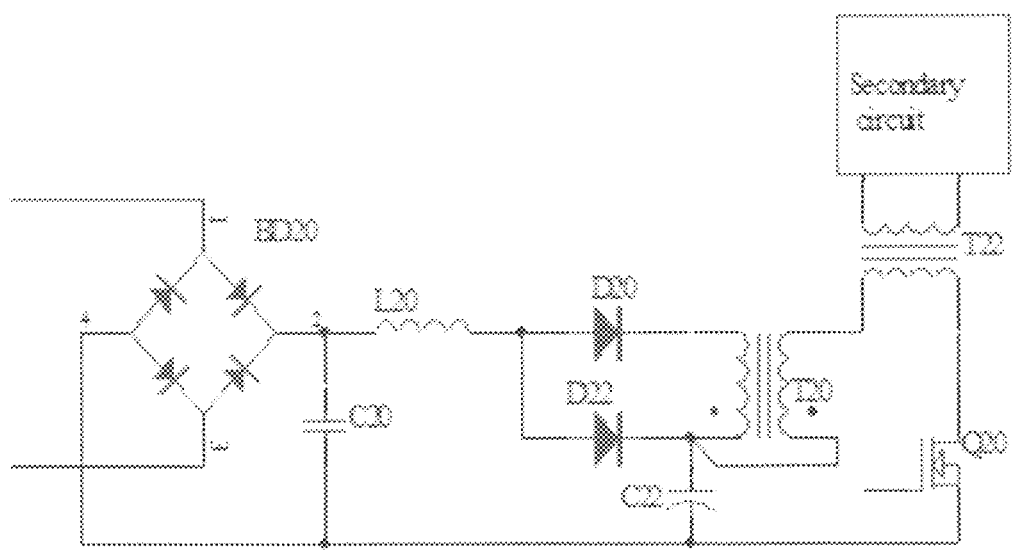
FIG. 3a is an embodiment of the present invention of the primary circuit of single switch power supply.

The Operation of the FIG. 3a is Following:

When switch Q20 is on, a current conducts through the primary winding of the main transformer T22 and the primary winding T20p of the forward transformer T20 and at the same time there is an induced voltage in the second winding T20s of the forward transformer T20, therefore, there is a current drawn from the input to the second capacitor C22 (charging the second capacitor C22) through the inductor L20, the first diode D20 and the second winding T20s of the forward transformer T20. When switch Q20 is off, the current charging the second capacitor C22 conducts through the inductor L20 and second diode D22.

The number of the windings of the second winding of the forward transformer T20 is more than two times of that of the primary winding of the forward transformer T20.

The number of the windings of the primary winding T20p of the forward transformer T20 and the value of the inductor L20 are adjusted to a certain value to correct the input current waveform in the best shape.

The circuit, comprising of the second winding T20s of the forward transformer T20, the inductor L20, the second capacitor C22, the first diode D20 and the second diode D22, can have several numerous different arrangements. These arrangements have the same working principle. For example, the inductor L20 can be coupled between the negative terminal of the second capacitor C22 and the negative output terminal of the full bridge rectifier BD20. The anodes of the first diode D20 and the second diode D22 are coupled to the positive output terminal of the full bridge rectifier BD20. The second winding T20s of the forward transformer T20 is coupled between the cathode of the first diode D20 and the junction of the cathode of the second diode D22 and the positive terminal of the second capacitor C22.

The control signal can be a PWM or a PFM signal and the PFM signal has better advantage for designing single stage PFC power supply of a fly-back type power supply.

Figure 5:
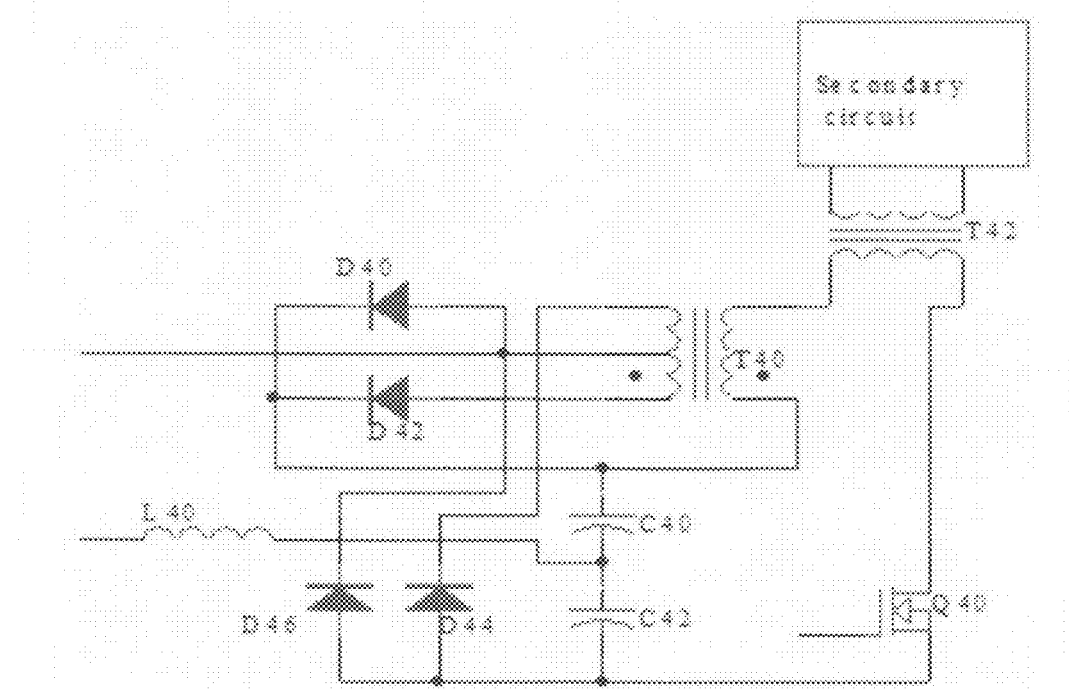
FIG. 5 is a schematic of the present invention of a fly-back or a forward power supply of the 120 v AC input.

For 120V AC power source, the circuit can be arranged as FIG. 5. The number of the windings of the second winding of the forward transformer is more than two times of that of the primary winding of the forward transformer.

What is claimed is:

1. A single-stage power factor correction converter comprising of:

A full bridge rectifier having input terminals which are coupled to input power lines, two output terminals, a positive output terminal and a negative output terminal;

A first capacitor which is coupled to output terminals;

A first inductor having a first terminal and a second terminal, the first terminal which is coupled to the positive output of the full bridge rectifier;

A first diode having a cathode and an anode which is coupled to the second terminal of the inductor;

A second diode having a cathode and an anode which is coupled to the second terminal of the inductor;

A forward transformer comprising of a primary winding, a second winding with a center tap; the primary winding of the forward transformer is coupled in series with the primary winding of the main transformer that is in the primary circuit of being one of a half bridge, a full bridge or a LLC power supply unit; the first terminal of the second winding of the forward transformer is coupled to the cathode of the first diode and the second terminal of the second winding is coupled to the cathode of the second diode;

A second capacitor having a positive terminal and a negative terminal, wherein said the positive terminal is coupled to the center tap of the second winding of the forward transformer and the negative terminal is coupled to the negative output of the full bridge rectifier.

2. A single-stage power factor correction converter in claim 1, wherein said the primary winding of the forward transformer is coupled in series with the main transformer primary winding circuit, wherein said energy through primary winding of the forward transformer is used said to correct power factor of the input current and wherein said energy through primary winding of the main transformer is used to transfer energy from primary circuit to secondary circuit.

3. A single-stage power factor correction converter in claim 2 wherein said the main transformer primary winding circuit is a primary circuit of being one of half bridge power supply unit, a LLC power supply unit or a full bridge power supply unit.

4. A single-stage power factor correction converter in claim 1, wherein said the second winding of the forward transformer is used to draw the current from the input to the storage capacitors, and wherein said the second winding of the forward transformer, the first diode, the second diode and the inductor have other arrangements.

5. A single-stage power factor correction converter in claim 4, wherein said an inductor, which is coupled between the positive terminal of the second capacitor and the center tap of the second winding of the forward transformer, is a storage component and said stores the electrical energy when the switches are on and said relieves the energy through the second diode or the first diode to the storage capacitors (the second capacitor and the third capacitor) when the switches are off.

6. A single-stage power factor correction converter in claim 4, wherein said the first diode and the second diode are used to rectify the current through the second winding of the forward transformer to charge storage capacitors.

7. A single-stage power factor correction converter comprising of:
A full bridge rectifier having output terminals and input terminals which are coupled to input power lines;
A first capacitor which is coupled to the output terminals of the full bridge rectifier;
An inductor having a first terminal and a second terminal, wherein said the first terminal of the inductor is coupled to the positive output of the rectifier;
A first diode having a cathode and an anode, wherein said the anode is coupled to the second terminal of the inductor;
A second diode having a cathode and an anode, wherein said the anode is coupled to the second terminal of the inductor;
A main transformer having a primary winding and a secondary winding, wherein said the main transformer is a fly-back transformer or a forward transformer or a push-pull forward transformer;

A forward transformer having a primary winding and a second winding, wherein said the second winding has a first terminal which is coupled to the cathode of the first diode and a second terminal which is coupled to the cathode of the second diode, and wherein said the primary winding of the forward transformer is connected in series with the primary winding of the main transformer;
A switch having a first terminal, a second terminal and a control terminal, wherein said the first terminal is coupled to the primary winding of the main transformer, the second terminal is coupled to the negative output terminal of the bridge rectifier and the control terminal is coupled to PWM signal;
A second capacitor having a positive terminal and a negative terminal, wherein said the positive terminal is coupled to the second terminal of the second winding of the forward transformer and the cathode of the second diode and wherein said the negative terminal is coupled to the negative output of the full bridge rectifier.

8. A single-stage power factor correction converter in claim 7, wherein said the primary winding of the forward transformer is connected in series with the primary winding of the main transformer, the energy through the primary winding of the forward transformer is used to correct the input current waveform, the energy through the primary winding of the main transformer is transferred to the secondary circuit of the main transformer.

9. A single-stage power factor correction Converter in claim 7, wherein said the inductor is used to smooth the input current and to store the energy from the input.

10. A single-stage power factor correction converter in claim 8, wherein said the second winding of the forward transformer, which is coupled between the positive terminal of the second capacitor and the cathode of the first diode, is used to provide the energy to draw the input current to the second capacitor.

11. A single-stage power factor correction converter in claim 8, wherein said the second diode, which is coupled between the second terminal of the inductor and the positive terminal of the second capacitor, is used to provide a mean to release the energy of the inductor and to correct input current waveform.

12. A single-stage power factor correction converter comprising of:
A forward transformer having a primary winding and a second winding with a center tap connected to a first input power line and the primary winding is coupled to a primary winding of the main transformer of a power converter unit which is a forward converter or a fly-back converter;
A first diode having a cathode and an anode which is coupled to the first terminal of the second winding of the forward transformer;
A second diode having an anode which is coupled to the first input power line and the center tap of the second winding of the forward transformer and a cathode which is coupled to the cathode of the first diode;
A third diode having an anode and a cathode which is coupled to the input power line;
A fourth diode having a cathode which is coupled to the second terminal of the second winding of the forward transformer and an anode which is coupled to the anode of the third diode;
An inductor having two terminals and one terminal coupled to a second input power line;
A first capacitor having a positive terminal which is coupled to the cathodes of the first diode, the second diode and first terminal of the primary winding of the forward transformer and a negative terminal which is coupled to the other terminal of the inductor;

A second capacitor having a positive terminal which is coupled to the negative terminal of the first capacitor and a negative terminal which is coupled to the anodes of the third diode and the fourth diode;

A main transformer having a primary winding of which the first terminal is coupled to the second terminal of the primary winding of the forward transformer and a secondary winding which is coupled to a secondary circuit;

A switch having a first terminal, a second terminal and a control terminal; the first terminal of the switch is coupled to the second terminal of the primary winding of the main transformer, the second terminal of the switch is coupled to the negative terminal of the second capacitor and the anodes of the third diode and the fourth diode, the control terminal of the switch is coupled to the control signal of PWM or PFM.

13. A single-stage power factor correction converter in claim 12, wherein said the primary winding of the forward transformer and the primary winding of the main transformer are coupled in series and wherein said the energy through main transformer is transferred to the secondary circuit.

14. A single-stage power factor correction converter in claim 12, wherein said the first terminal of the second winding of the forward transformer and the first terminal of the primary winding of the forward transformer have the same polarity.

15. A single-stage power factor correction converter comprising of:

A forward transformer having a primary winding and a second winding with a center tap connected to a first input power line and the primary winding is coupled to the primary winding of a main transformer in a power converter unit of a half-bridge, or a full-bridge or a LLC;

A first diode having a cathode and an anode which is coupled to the first terminal of the second winding of the forward transformer;

A second diode having a cathode which is coupled to the cathode of the first diode and an anode which is coupled to the second terminal of the second winding of the forward transformer;

A third diode having an anode and a cathode which is coupled to the first terminal of the second winding of the forward transformer;

A fourth diode having an anode which is coupled to the anode of the third diode and a cathode which is coupled to the second terminal of the second winding of the forward transformer;

A first capacitor having a positive terminal and a negative terminal, the positive terminal is coupled to the cathodes of the first diode and the second diode;

A second capacitor having a positive terminal which is coupled to the negative terminal of the first capacitor and a negative terminal which is coupled to the anodes of the third diode and the fourth diode;

An inductor having a first terminal and a second terminal, the first terminal is coupled to the second input power line and the second terminal is coupled to the negative terminal of the first capacitor and the positive terminal of the second capacitor.

16. A single-stage power factor correction converter in claim 15, wherein said the primary winding of the forward transformer is coupled to the primary winding of the main transformer in series and the energy through the primary winding of main transformer is transferred to the secondary circuit, the energy through the primary winding of the forward transformer is used to correct input current waveform.

17. A single-stage power factor correction converter in claim 15, wherein said the first diode, the second diode, the third diode, the fourth diode, the second winding of the forward transformer and the inductor form a rectified and power factor correction circuit.

18. A single-stage power factor correction converter in claim 17, wherein said the inductor is a storage component, it stores energy when the switch is on and releases energy when the switch is off.

* * * * *